(12) United States Patent
Bardon et al.

(10) Patent No.: US 7,445,656 B2
(45) Date of Patent: Nov. 4, 2008

(54) FILTRATION STRUCTURE FOR THE EXHAUST GAS FROM AN INTERNAL COMBUSTION ENGINE

(75) Inventors: Sébastien Bardon, Lyons (FR); Vincent Glaize, Avignon (FR); Julien Romeyer, Annecy (FR)

(73) Assignee: Saint-Gobain Centre de Recherches et d'Etudes Europeen, Courbevoie (FR)

( * ) Notice: Subject to any disclaimer, the term of this patent is extended or adjusted under 35 U.S.C. 154(b) by 521 days.

(21) Appl. No.: 10/552,276

(22) PCT Filed: Mar. 29, 2004

(86) PCT No.: PCT/FR2004/000786

§ 371 (c)(1),
(2), (4) Date: Sep. 4, 2005

(87) PCT Pub. No.: WO2004/090294

PCT Pub. Date: Oct. 21, 2004

(65) Prior Publication Data

US 2006/0191244 A1    Aug. 31, 2006

(30) Foreign Application Priority Data

Apr. 1, 2003   (FR) .................................. 03 04052
Feb. 4, 2004   (FR) .................................. 04 01080

(51) Int. Cl.
*B01D 46/00* (2006.01)
*F01N 3/022* (2006.01)

(52) U.S. Cl. ........................ 55/523; 55/282.3; 55/385.3; 55/482; 55/483; 55/484; 55/524; 55/DIG. 5; 55/DIG. 10; 55/DIG. 30; 60/311; 428/116

(58) Field of Classification Search ................. 55/282.2, 55/282.3, 385.3, 482, 483, 484, 523, 524, 55/DIG. 5, DIG. 10, DIG. 30; 60/311; 428/116, 428/117, 118
See application file for complete search history.

(56) References Cited

U.S. PATENT DOCUMENTS

| | | | | |
|---|---|---|---|---|
| 4,335,783 A * | 6/1982 | McBrayer et al. | ............ | 428/116 |
| 6,126,833 A * | 10/2000 | Stobbe et al. | .................. | 55/523 |
| 6,942,712 B2 * | 9/2005 | Hamanaka et al. | ............ | 55/523 |
| 6,984,253 B2 * | 1/2006 | Ichikawa et al. | ............... | 55/523 |
| 7,037,567 B2 * | 5/2006 | Hashimoto et al. | .......... | 428/116 |
| 7,214,253 B2 * | 5/2007 | Bardon et al. | .................. | 55/523 |
| 7,294,316 B2 * | 11/2007 | Harada et al. | ............... | 428/116 |
| 7,332,014 B2 * | 2/2008 | Ono et al. | ...................... | 55/523 |

FOREIGN PATENT DOCUMENTS

EP    816065 A1    1/1998
EP    1 142 619 A1    10/2001

* cited by examiner

*Primary Examiner*—Jason M Greene
(74) *Attorney, Agent, or Firm*—Sughrue Mion, PLLC

(57) ABSTRACT

The structure comprises at least first and second filter members (15A, 15B) respectively provided with first and second faces (24A, 24B) placed facing each other, and a joint (17) interconnecting said faces and extending between said faces (24A, 24B). The first face (24A) comprises at least one region (33A) of strong adhesion with said joint (17) and at least a region (35A) of weak or no adhesion with the joint (17). These regions (33A, 35A) are located respectively facing a region (35B) of the second face (24B) presenting weak or no adhesion with said joint (17), and a region (35B) of the second face (24B) presenting strong adhesion with said joint (17). The structure is applicable to particle filters for the exhaust gas from an internal combustion engine.

15 Claims, 6 Drawing Sheets

FILTRATION STRUCTURE FOR THE EXHAUST GAS FROM AN INTERNAL COMBUSTION ENGINE

BACKGROUND OF THE INVENTION.

The present invention relates to a filter structure, in particular a particle filter for the exhaust gas from an internal combustion engine, the filter being of the type comprising:
- at least first and second filter members provided with first and second faces located facing each other; and
- a joint connecting said faces together and extending between said faces.

Such structures are used in particular in devices for depolluting the exhaust gas from internal combustion engines. Such devices comprise an exhaust pipe including in series therein a catalytic purifier member and a particle filter. The catalytic purifier member is adapted to treat the polluting emissions that are in the gaseous phase, while the particle filter is adapted to retain the particles of soot emitted by the engine.

In known structures of the above-specified type (see EP-A-1 142 619, for example), the filter members comprise a set of adjacent ducts with parallel axes that are separated by porous filter walls. The ducts extend between an admission face for admitting the exhaust gas to be filtered and an exhaust face for exhausting the filtered exhaust gas. The ducts are also closed at one or other of their ends so as to define inlet chambers opening out to the admission face and outlet chambers opening out to the exhaust face.

Those structures are operated in a succession of filtering and regeneration stages. During filtering stages, the soot particles emitted by the engine become deposited on the walls of the inlet chambers. Head loss through the filter increases progressively. Beyond some predetermined value for said head loss, a regeneration stage is performed.

During the regeneration stage, the soot particles which are constituted essentially by carbon are burned on the walls of the inlet chambers so as to restore its original properties to the structure.

Nevertheless, soot particles do not accumulate in uniform manner within the filter members. Thus, soot accumulates preferentially in the center of the filter structure and towards the exhaust gas exhaust face. During regeneration stages, the burning of the soot raises the temperature in the preferential accumulation zones to a temperature higher than that observed in the other zones of the structure.

The temperature gradients within the filter structure lead to local expansions of different amplitudes, and consequently to longitudinal and transverse stresses in and/or to stresses between the various filter members.

These high levels of thermomechanical stress give rise to cracking in the filter members and/or in the connection joints between the filter members.

To limit the risk of such cracks appearing, patent application EP-A-1 142 619 proposes using connection joints of thickness selected to lie in the range 0.3 millimeters (mm) to 3 mm, and having thermal conductivity lying in the range 0.1 watts per meter kelvin (W/m.K) to 10 W/m.K.

Present structures do not give entire satisfaction. Beyond some number of regeneration stages, cracks can appear in the connection joints. These cracks are accompanied by a complete loss of cohesion in the filter structure. This loss of cohesion gives rise to leaks and the structure must be replaced.

SUMMARY OF THE INVENTION

A main object of the invention is to remedy that drawback, i.e. to provide a porous filter structure for a particle filter that enables filter utilization to be prolonged.

To this end, the invention provides a filter structure of the above-specified type, characterized in that the first face comprises at least a first zone of strong adhesion with said joint and at least a zone of weak or no adhesion with the joint, said zones respectively comprising a first region of strong adhesion with said joint and a region of weak or no adhesion with joint, said regions being disposed respectively facing a first region of weak or no adhesion with said joint on the second face, and a region of strong adhesion with said joint on the second face.

The filter structure of the invention may include one or more of the following characteristics, taken in isolation or in any technically feasible combination:
- the first face further comprises a second zone of strong adhesion with said joint comprising a second region of strong adhesion with said joint placed facing a second region of weak or no adhesion with said joint on the second face;
- in at least one section of the filter structure, the region of weak or no adhesion with said joint on the first face lies between the first and second regions of strong adhesion with said joint on said first face;
- said section is a longitudinal section;
- said section is a cross-section;
- a filter member is a prismatic brick having each of its side faces facing a side face of an associated filter member, a joint extending between said faces to connect them together; and each of the side faces of the brick comprises at least one zone of strong adhesion between said face of the brick and said joint, and at least one zone of weak or no adhesion between said face and said joint, said zones comprising respectively a region of said face of the brick presenting strong adhesion with said joint, and a region of said face presenting weak or no adhesion with said joint, said regions being disposed respectively facing a region of the facing face of the associated filter member presenting weak or no adhesion with said joint, and a region of the facing face of the associated filter member presenting strong adhesion with said joint;
- the region of the first face of the brick presenting strong adhesion with said joint is disposed opposite from a region of a second face of the same brick presenting weak or no adhesion with said joint;
- each of the zones of weak or no adhesion with said joint is covered in an anti-adhesive coating, at least prior to the structure being put into operation;
- each of the first and second filter members has an admission face and an exhaust face interconnected by said first and second faces, at least one downstream region of the first face presenting weak or no adhesion with said joint extending to the common edge between the exhaust face and said first face;
- said downstream region presents a length taken parallel to a longitudinal direction of the first filter member that is less than one-fifth of the length of said first filter member taken along said longitudinal direction;
- said downstream region presents a length, taken parallel to a longitudinal direction of the first filter member, that is less than half of at least one other region of the same face;
- the first filter member further comprises a side face adjacent to the first face, the side face presenting a side region of strong adhesion with said joint extending to the common outlet edge between said side face and said exhaust face; and at least the downstream region of weak or no adhesion with the joint, presents surface irregularities beside the joint, and in particular corrugations and/or grooves.

The term "prismatic brick" designates an assembly having an inlet face, an outlet face, and at least three side faces connecting the inlet face to the outlet face.

BRIEF DESCRIPTION OF THE DRAWINGS.

Embodiments of the invention are described below with reference to the accompanying drawings, in which.

Figure 1:
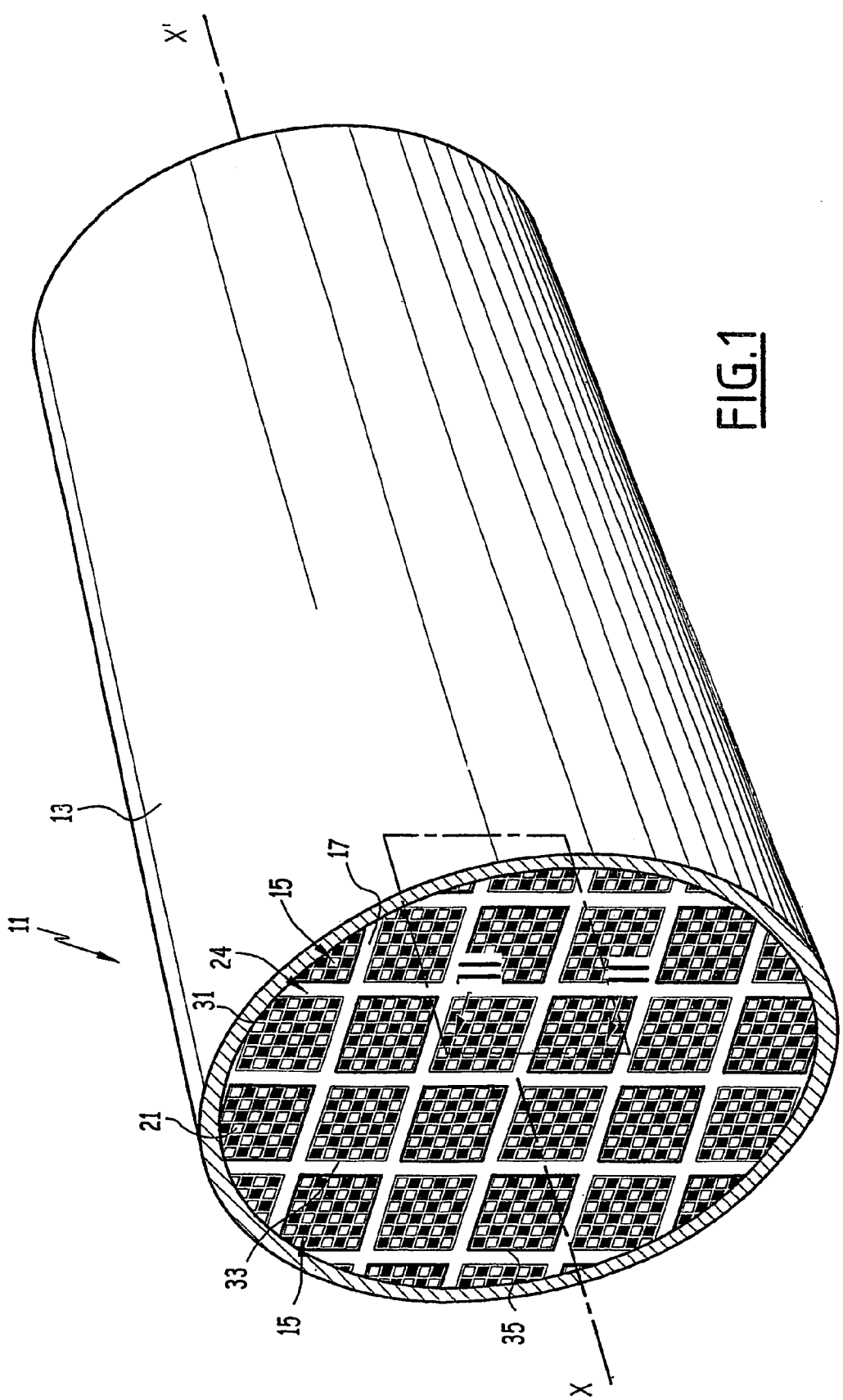
FIG. 1 is a perspective view of a first filter structure of the invention.

The particle filter 11 shown in FIG. 1 is placed in an exhaust pipe 13 for exhaust gas from a diesel engine of a motor vehicle, the figure showing only part of the exhaust pipe.

DETAILED DESCRIPTION OF THE DRAWINGS.

The exhaust pipe 13 extends beyond the ends of the particle filter 11 and defines a passage along which the exhaust gas flows.

The particle filter 11 extends along a longitudinal exhaust gas flow direction X-X'. It comprises a plurality of filter blocks 15 interconnected by connection joints 17.

Each filter block 15 is substantially in the form of an elongate rectangular parallelepiped extending in the longitudinal direction X-X'.

Figure 2:
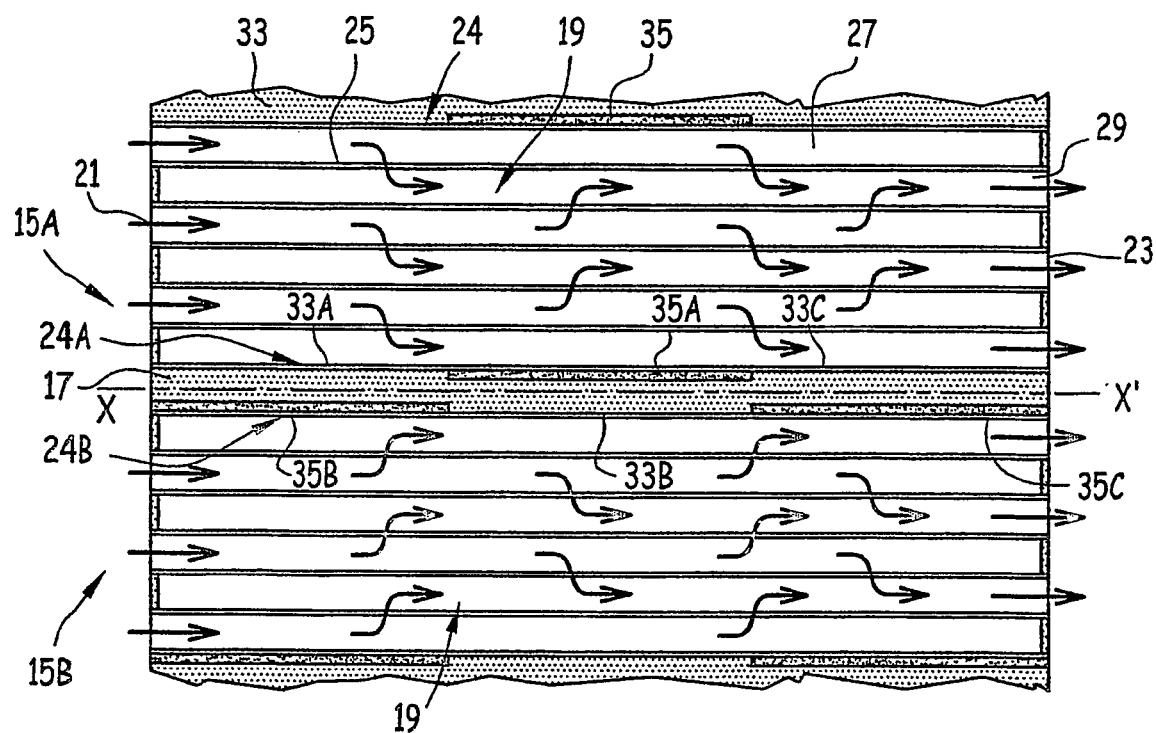
FIG. 2 is a fragmentary section view on line II-II showing the filter structure of FIG. 1.

As shown in FIG. 2, each filter block 15A, 15B comprises a porous filter structure 19, an admission face 21 for admitting the exhaust gases to be filtered, an exhaust face 23 for exhausting the filtered exhaust gas, and at least four side faces 24.

The porous filter structure 19 is made of a filter material constituted by a one-piece structure, in particular of ceramic (cordierite or silicon carbide).

The structure 19 is sufficiently porous to allow the exhaust gas to pass through. However, and as is known, the pores are of a diameter that is selected to be sufficiently small to retain soot particles.

The porous structure 19 comprises a set of adjacent ducts of axis parallel to the longitudinal direction X-X'. These ducts are separated by porous filter walls 25. In the example shown in FIG. 1, these walls 25 are of constant thickness and extend longitudinally along the filter structure 19 from the admission face 21 to the exhaust face 23.

The ducts are organized as first and second groups of ducts: an inlet group of ducts 27; and an outlet group of ducts 29. The inlet ducts 27 and the outlet ducts 29 extend in opposite directions.

The inlet ducts 27 are closed in the exhaust face 23 of the filter block 15A, 15B and are open at their opposite ends.

In contrast, the outlet ducts 29 are closed in the admission face 21 of the filter block 15A, 15B and they open out into its exhaust face 23.

In the example of FIG. 1, the inlet ducts 27 and the outlet ducts 29 are of constant section along their entire length.

As shown in FIG. 1, the side faces 24 of the filter block situated facing another filter block are plane. The side faces 31 situated facing the exhaust pipe 13 are of appropriate shape for making contact with the cylindrical inside wall of the pipe 13.

Figure 3:
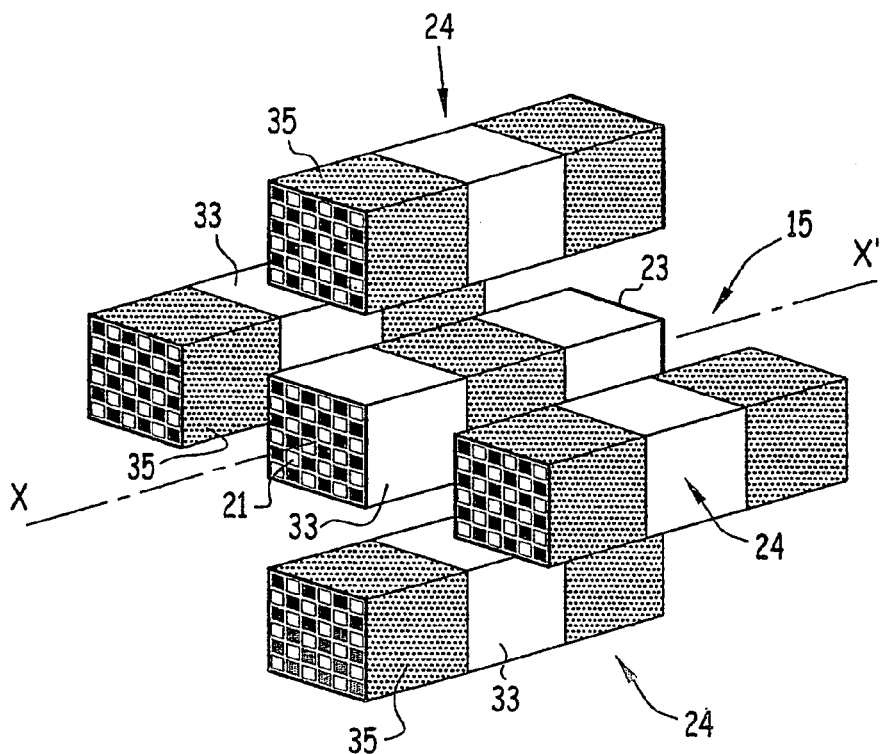
FIG. 3 is a fragmentary exploded perspective view of the FIG. 1 filter structure.

As shown in FIGS. 2 and 3, each of the plane faces 24 situated facing another filter block includes at least one zone 33 that is firmly secured to the joint 17 and at least one other zone 35 that, during manufacture of the structure 19, is covered in an anti-adhesive coating. By way of example, the coating is based on paper, polytetra-fluoroethylene, or boron nitride.

Thus, the zone 33 constitutes a region of strong adhesion with the joint 17, while the zone 35 constitutes a region of weak or no adhesion with the joint 17.

Adhesion between the connection joints 17 and the plane faces 24 of the filter block 15 in the zones 33 of strong adhesion is at least 10 times greater than the adhesion in the zones 35 of weak or zero adhesion, said adhesion lying in the range 0 to 50 megapascals (MPa).

By way of example, the disposition of the zones 33 and the zones 35 on the plane faces 24 of the filter block 15 is as shown in FIGS. 2 and 3.

As shown in FIG. 2, the first plane face 24A of the first filter block 15A comprises in succession, along the longitudinal direction X-X': a first zone 33A of strong adhesion with the joint 17; a zone 35A of weak or no adhesion with the joint 17; and a second zone 33C of strong adhesion with the joint 17.

The second filter block 15B has a second face 24B facing the first face 24A.

This second face 24B comprises in succession in the direction X-X': a first zone 35B of weak or no adhesion facing the first zone 33A of strong adhesion on the first face 24A; a zone 33B of strong adhesion facing the zone 35B of weak or no adhesion on the first face 24A; and a second zone 35C of weak or no adhesion facing the second zone 33C of strong adhesion on the first face 24A.

In the example shown in FIG. 3, this relative disposition of the zones 33 of strong adhesion and the zone 35 of weak or no adhesion is common to all of the plane faces 24 of any one filter block 15.

The connection joint 17 is disposed between the plane faces 24 of the filter blocks 15. This connection joint 17 is based on ceramic cement, generally being constituted by silica and/or silica carbide and/or aluminum nitride. After sintering, the cement has a modulus of elasticity of about 5000 MPa. It is this cement that bonds the filter blocks together.

When assembling the structure 19, a first filter stage is constituted by assembling filter blocks 15 in pairs along vertical surfaces using the connection joint 17.

A second filter layer is then made using the same method.

When the connection joint is constituted by a cement that is very rigid, and regardless of the way in which the zones 33 and 35 are arranged on the various faces of the blocks 15, prior to assembling together the first and second filter layers via horizontal surfaces, protection pieces (e.g. slips of card) are disposed between the horizontal surfaces of the bricks so as to cover the edges adjacent to zones of the vertical surfaces having weak or no adhesion. This avoids the connection joint forming horizontal bridges of strong adhesion between the zones of weak or no adhesion of the vertical surfaces.

The operation of the first filter structure of the invention is described below.

During a filtering stage (FIG. 1), exhaust gas carrying particles is guided to the inlet faces 21 of the filter blocks 15 by the exhaust pipe 13. As represented by arrows in FIG. 2, the gas then penetrates into the inlet ducts 27, and passes through the walls 25 of the porous structure 19. When the gas passes through the walls 25 the soot becomes deposited on the walls 25 in the inlet ducts 27. The soot becomes deposited preferentially in the center of the particle filter 11 and towards the exhaust face 23 of the filter blocks 15 (on the right in the drawing).

The filtered exhaust gas is exhausted from the exhaust duct 29 and guided to the outlet of the muffler.

Once the vehicle has traveled about 500 kilometers (km), head loss through the filter 11 increases in significant manner. A regeneration stage is then performed.

During this stage, the soot is oxidized by raising the temperature of the filter 11. This oxidation is exothermal. The non-uniform distribution of soot in the filter 11 gives rise to a temperature gradient between the zones having large accumulations of soot and the zones having small accumulations of soot.

Furthermore, the filter blocks and the joints expand under the effect of temperature. The local amplitude of this expansion depends on the temperature.

These variations of expansion amplitude under the effect of temperature gradients lead to high levels of thermomechanical stress. The Applicant believes that the system of the present invention, by virtue of its zones of weak or no adhesion, enables the stresses to be relaxed without leading to cracks in a filter member or in the connection joint.

Furthermore, the zones of weak or no adhesion and the zones of strong adhesion are arranged in such a manner that if the thermomechanical stresses are too great for the structure, then cracking will occur in privileged zones 41.

Figure 4:
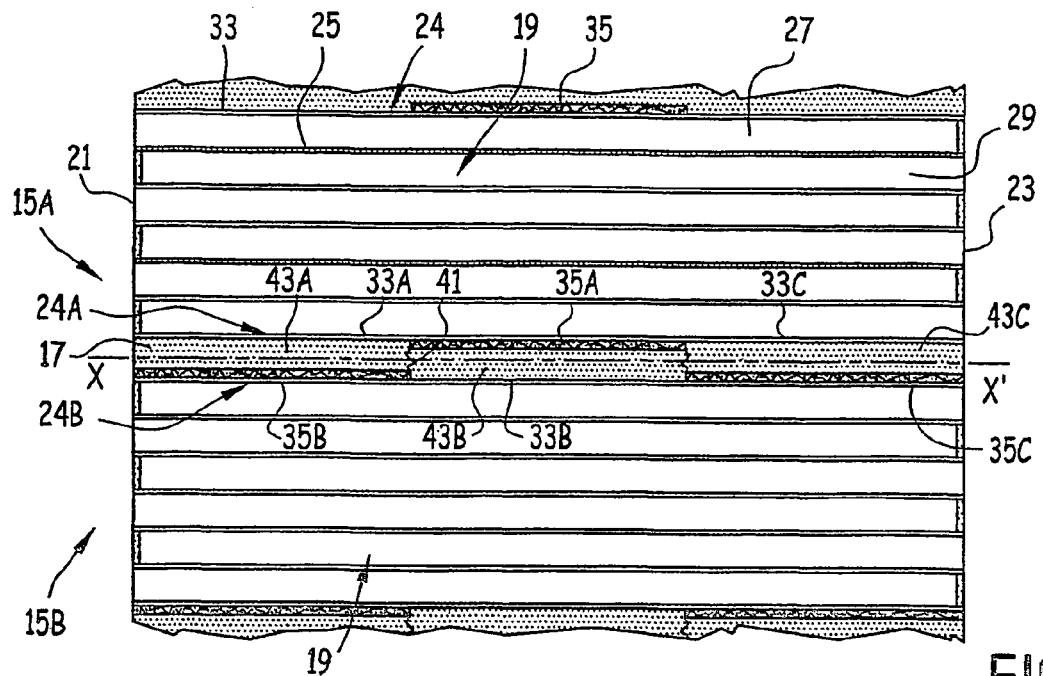
FIG. 4 is a view analogous to FIG. 2 after several regeneration cycles of the filter structure.

Thus, as shown in FIG. 4, the propagation of cracks 41 in the joints 17 is guided along the zones 35 of weak or no adhesion between the joint 17 and the plane faces 24 of the filter blocks 15. Thus, the cracks 41 between the first filter block 15A and the second filter block 15B are localized in the first zone 35B of weak or no adhesion on the second face 24B, then between the right-hand end of said zone 35B and the left-hand end of the zone 35A of weak or no adhesion on the first face and then along said zone 35A of weak or no adhesion.

Even if the joint 17 becomes totally cracked in said zones 35A and 35B, a first portion 43A of the joint 17 remains secured to the first filter block 15A in the first zone 33A of strong adhesion on the first face 24A. A second portion 43B of the joint 17 of shape complementary to the first portion 43A remains secured to the second filter block 15B along the zone of strong adhesion 33B of the second face 24B.

Interaction between these first and second portions 43A and 43B of the joint 17 prevents the first filter block 15A from moving longitudinally relative to the second filter block 15B towards the exhaust faces 23 of the filter blocks 15A and 15B.

Furthermore, the propagation of the cracks 41 is guided between the right-hand end of the zone 35A of weak or no adhesion on the first face 24A to the left-hand end of the second zone 35C of weak or no adhesion on the second face 24B along said second zone 35C.

Even if the joint becomes totally cracked in said zones 35B and 35C, the first filter block 15A remains secured to a third portion 43C of the joint 17 in register with the second zone 33C of strong adhesion on the first face 24A. This third portion 43C is complementary in shape to the second portion 43B of the joint 17.

This third portion 43C interacts with the second portion 43B to prevent displacement of the first block 15A relative to the second block 15B along the longitudinal direction X-X' towards the admission faces 21 of the filter blocks 15A and 15B.

In this particle filter, thermomechanical stresses are thus relaxed, depending on their strength, either by the structure itself (in the presence of zones of no adhesion), or by the formation of cracks 41 which propagate in a controlled manner.

Furthermore, the propagation of these cracks 41 in the joint 17 is guided in such a manner as to prevent displacement of the filter blocks 15 relative to one another, thereby ensuring that the particle filter 11 remains proof against passing soot.

Figure 5:
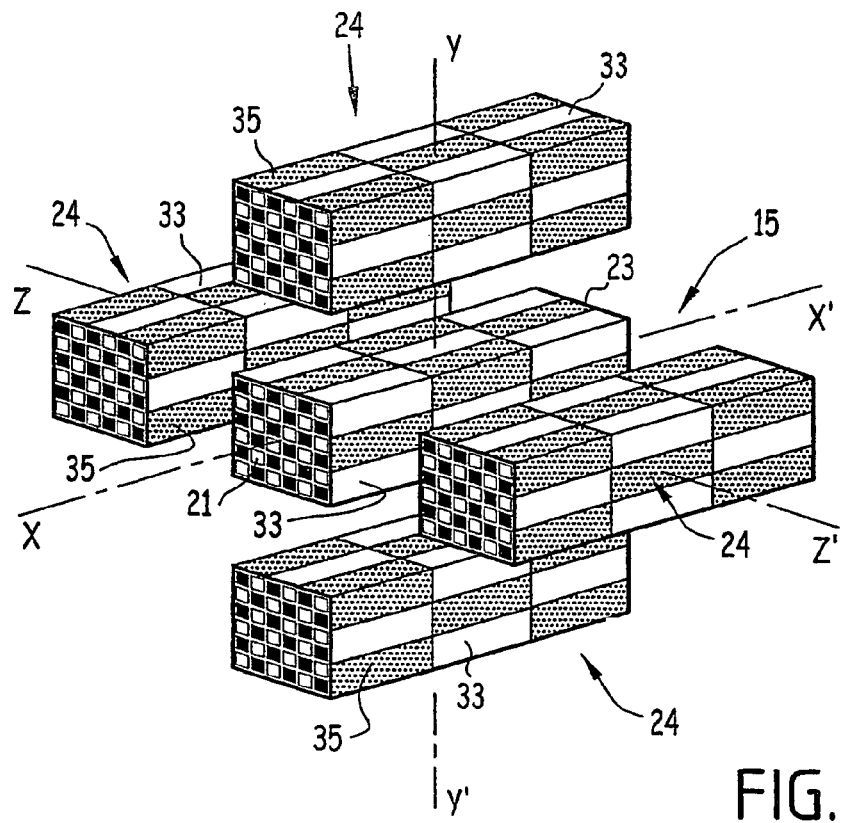
FIG. 5 is a view analogous to FIG. 3 in a variant of the first filter structure of the invention.

In the variant shown in FIG. 5, unlike the structure shown in FIG. 3, the zones 33 of strong adhesion with the joint 17 and the zones 35 of weak or no adhesion with the joint 17 on each of the plane faces 24 of the filter blocks 15 are disposed successively in alternation both in directions parallel to the longitudinal direction X-X', and in directions parallel to the transverse directions Y-Y' and Z-Z' perpendicular to the longitudinal direction X-X'. The zones 33 and the zones 35 thus form a checkerboard structure on each of the faces 24 of each block 15.

Furthermore, the zones 33 of strong adhesion with the joint 17 and the zones 35 of weak or no adhesion with the joint 17 on a face 24 of a block 15 are situated respectively in register with zones 35 of weak or no adhesion with the joint 17 and zones 33 of strong adhesion with the joint 17 on a face 24 of another block 15.

In this structure, relative displacement between the blocks is avoided both in the longitudinal direction X-X', and in the transverse directions Y-Y' and Z-Z'.

Figure 6:
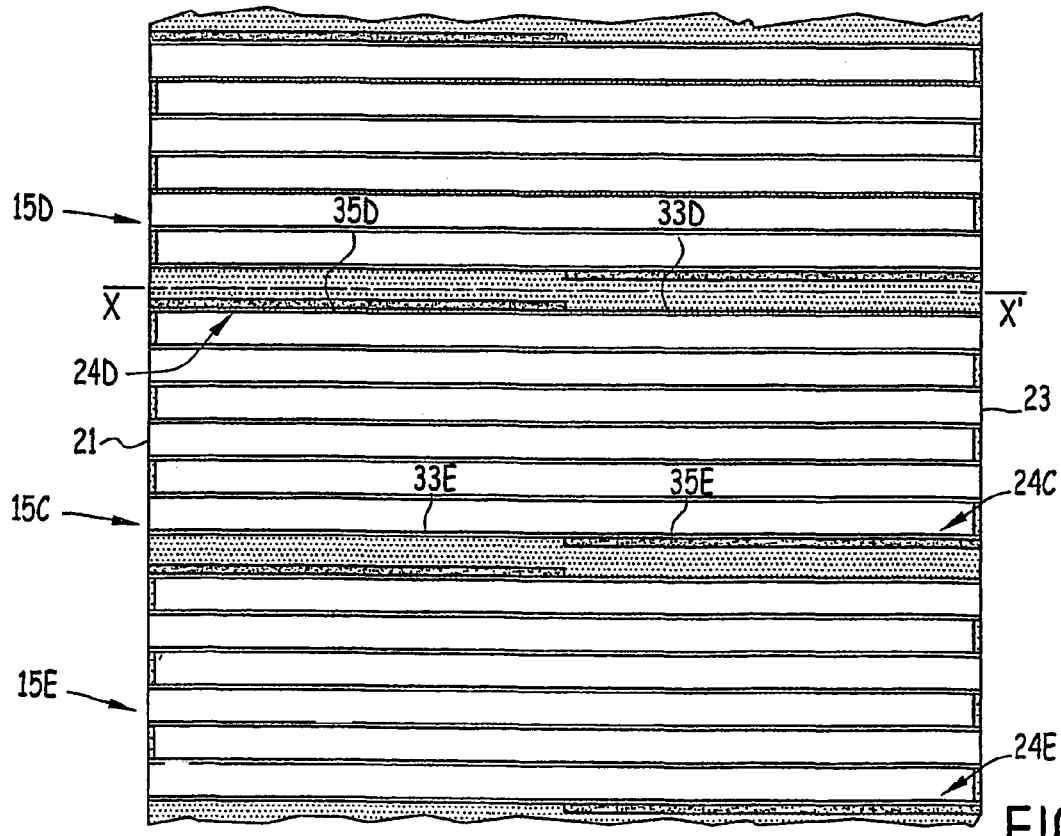
FIG. 6 is a view analogous to FIG. 2 of a second filter structure of the invention.

In the variant shown in FIG. 6, the central filter block 15C comprises in succession along the direction X-X' and on a first face 24D: a first zone 33D of strong adhesion with the joint 17; and a single zone 35D of weak adhesion with the joint 17. On a second face 24E opposite to the first face 24D, it also has a second zone 35E of weak or no adhesion opposite the first zone 33D of strong adhesion with the joint 17, and a second zone 33E of strong adhesion with the joint 17 opposite the first zone 35D of weak or no adhesion with the joint 17. The filter blocks 15D and 15E situated facing the first and second faces 24D and 24E have zones of strong adhesion and zones of weak adhesion respectively facing zones of weak adhesion 35D, 35E and zones of strong adhesion 33D, 33E of the first and second faces 24D and 24E of the central filter blocks 15C.

In this example, if the joint 17 cracks, the relative longitudinal displacement of the central filter block 15C towards the exhaust faces 23 is prevented by the relative disposition of the zones of strong adhesion and the zones of weak adhesion on its first face 24E. Similarly, relative longitudinal displacement of said block 15C towards the admission faces 21 is prevented by the distribution of zones of strong adhesion and of the zones of weak or no adhesion on its second face 24E.

In a variant, a portion of a zone of strong adhesion on one face of a block may be placed facing a portion of a zone of strong adhesion on a facing block. Similarly, a portion of a zone of weak or no adhesion on one face of a block may be disposed facing a portion of a zone of weak or no adhesion on a facing block.

By means of the invention as described above, it is possible to obtain a filter structure that can survive a multitude of regeneration stages while preserving its mechanical cohesion and its ability to prevent soot from passing through.

Figure 7:
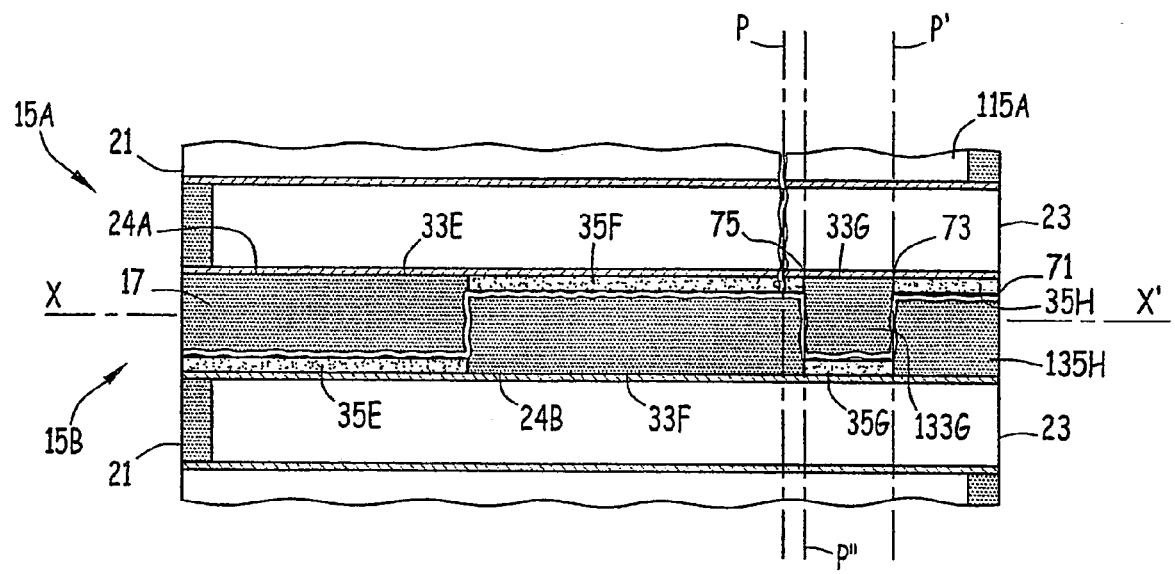
FIG. 7 is a view analogous to FIG. 4, on a larger scale, showing a third filter structure of the invention.

In the variant shown in FIG. 7, the first face 24A comprises in succession, from upstream to downstream and parallel to the longitudinal direction X-X': a fourth zone 33E of strong adhesion with the joint 17; a fifth zone 35F of weak or no adhesion with the joint 17; a sixth zone 33G of strong adhesion with the joint 17; and a seventh zone 35H of weak or no adhesion with the joint 17. Each zone 33 of strong adhesion with the joint 17 on the first face 24A is placed facing a zone 35 of weak or no adhesion with the joint 17 of the second face 24B. Furthermore, each zone 35 of weak or no adhesion with the joint 17 of the first face 24A is placed facing a zone 33 of strong adhesion with the joint 17 on the second face 24B.

As shown in FIG. 7, the seventh zone 35H of weak or no adhesion with the joint 17 is defined downstream by the edge 71 common to the first face 24A and the outlet face 23 of the first filter block 15A.

In addition, the length of each of the sixth and seventh zones 33G and 35H taken along the longitudinal direction X-X' is shorter than one-fifth of the length of the first filter block 15A, taken along the longitudinal direction X-X', and than one-half of the length of each of the third and fourth zones 33E and 35F, likewise taken along the longitudinal direction X-X'.

In the event of the joint 17 cracking within the first block 15A, this disposition serves to retain any downstream portion 115A of the first filter block 15A defined by a transverse cracking plane P situated between the inlet face 21 and a transverse plane P' passing through the downstream edge 73 of the sixth zone 33G.

This retention is provided by co-operation between an abutment 135H secured to the second block 15B in the joint 17 facing the seventh zone 35H, and an abutment 133G secured to the downstream portion 115A in the joint 17 facing the sixth zone 33G.

Furthermore, in circumstances (not shown) in which the first block 15A remains intact and the cracking appears in the second block 15B, any downstream portion of the second filter block 15B defined by a transverse cracking plane situated between the inlet face 21 and a plane P''' passing through the downstream edge 75 of the fifth zone 35F is retained.

Figure 8:
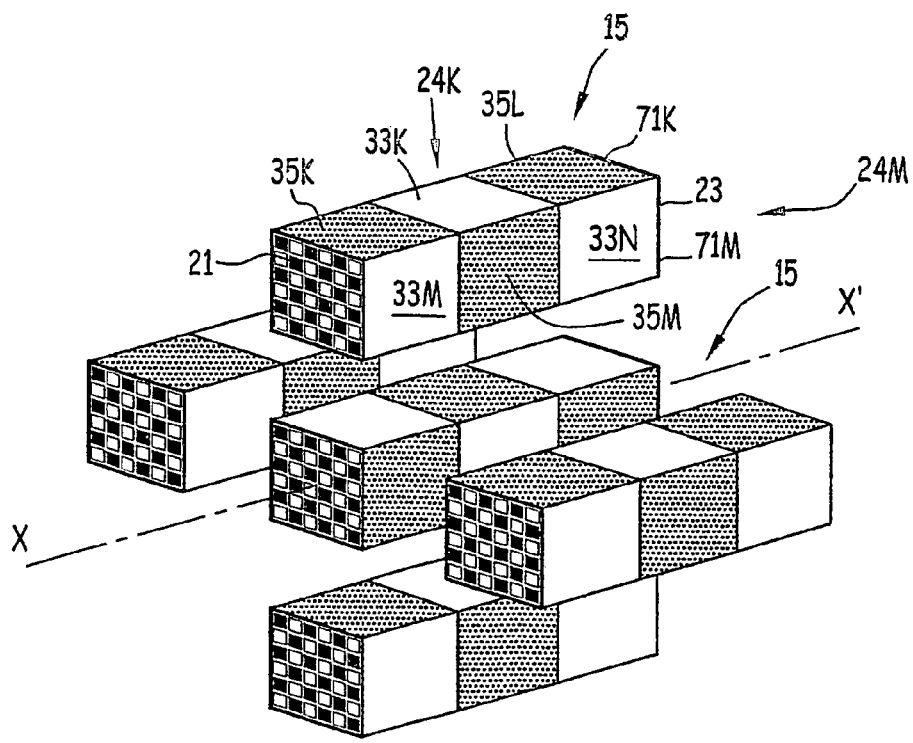
FIG. 8 is a view analogous to FIG. 3 of a fourth filter structure of the invention.

In the variant shown in FIG. 8, each block 15 possesses at least one first face 24K presenting in succession, from upstream to downstream: a first zone 35K of weak or no adhesion with the joint 17; a zone 33K of strong adhesion with the joint 17; and a second zone 35L of weak or no adhesion with the joint 17, defined at its downstream end by the edge 71K that is common to the first face 24K and the outlet face 23.

Furthermore, each block 15 also presents a side face 24M adjacent to the first face 24K that presents in succession, from upstream to downstream: a first zone 33M of strong adhesion with the joint 17; a zone 35M of weak or no adhesion with the joint 17; and a second zone 33N of strong adhesion with the joint 17, adjacent to the outlet edge 71M common to the side face 24M and the outlet face 23.

In this "checkerboard" structure, each zone 33 of strong adhesion with the joint 17 on the first face 24K is adjacent to a zone 35 of weak or no adhesion with the joint 17 on the adjacent face 24M.

Figure 9:
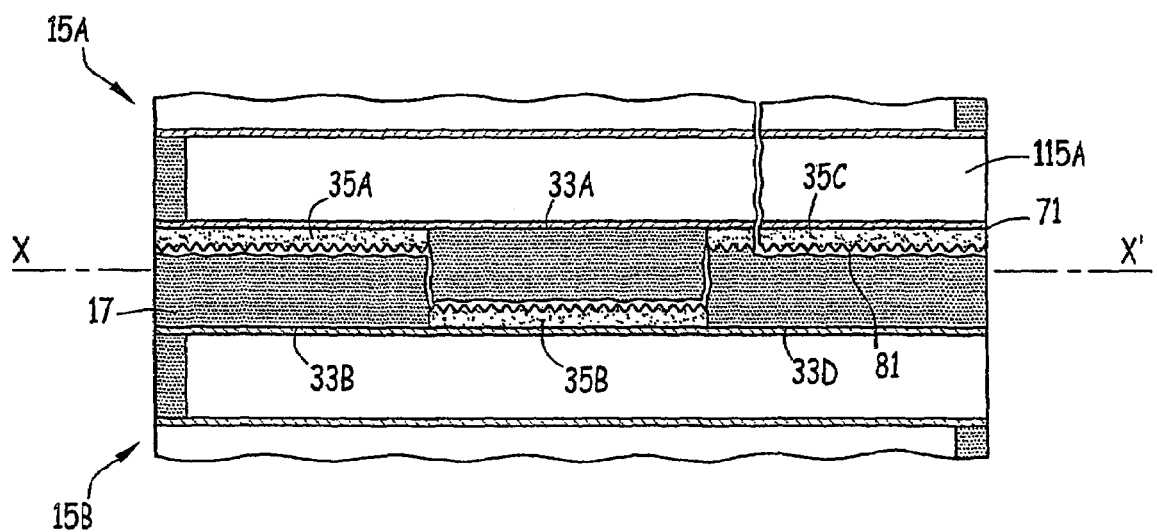
FIG. 9 is a view analogous to FIG. 2, on a larger scale, showing a fifth filter structure of the invention.

In the variant shown in FIG. 9, the zones 35 of weak or no adhesion on each block also present, beside the joint 17, surface irregularities 81, e.g. grooves and/or corrugations, as described in French patent application No. 03/08588 in the name of the Applicant.

These surface irregularities 81 preferably extend parallel to a direction that is inclined or transverse relative to the longitudinal direction X-X' of the block 15.

These irregularities 81 lead to an increase in the roughness of the zones 35 of weak or no adhesion. Thus, the increased roughness in the zone 35C of weak or no adhesion with the joint 17 adjacent to the common edge 71 of the first block 15A serves to retain a downstream portion 115A of the first filter block that might otherwise become detached in the event of cracking in a transverse plane within the first block 15A.

The invention claimed is:

1. A filter structure comprising:
   at least first and second filter members provided with first and second faces located facing each other; and
   a joint connecting said faces together and extending between said faces;
   wherein the first face comprises at least a first zone of strong adhesion with said joint and at least a zone of weak or no adhesion with the joint, said zones respectively comprising a first region of strong adhesion with said joint and a region of weak or no adhesion with said joint, said regions being disposed respectively facing a first region of weak or no adhesion with said joint on the second face, and a region of strong adhesion with said joint on the second face.

2. A structure according to claim 1, wherein the first face further comprises a second zone of strong adhesion with said joint comprising a second region of strong adhesion with said joint placed facing a second region of weak or no adhesion with said joint on the second face.

3. A structure according to claim 2, wherein, in at least one section of the filter structure, the region of weak or no adhesion with said joint on the first face lies between the first and second regions of strong adhesion with said joint on said first face.

4. A structure according to claim 3, wherein said section is a longitudinal section.

5. A structure according to claim 3, wherein said section is a cross-section.

6. A structure according to claim 1, wherein at least one filter member is a prismatic brick having each of its side faces facing a side face of an associated filter member, a joint extending between said faces to connect them together; and wherein each of the side faces of the brick comprises at least one zone of strong adhesion between said face of the brick and said joint, and at least one zone of weak or no adhesion between said face and said joint, said zones comprising respectively a region of said face of the brick presenting strong adhesion with said joint, and a region of said face presenting weak or no adhesion with said joint, said regions being disposed respectively facing a region of the facing face of the associated filter member presenting weak or no adhesion with said joint, and a region of the facing face of the associated filter member presenting strong adhesion with said joint.

7. A structure according to claim 6, wherein the region of the first face of the brick presenting strong adhesion with said joint is disposed opposite from a region of a second face of the same brick presenting weak or no adhesion with said joint.

8. A structure according to claim 1, wherein each of the zones of weak or no adhesion with said joint is covered in an anti-adhesive coating, at least prior to the structure being put into operation.

9. A structure according to claim 1, wherein each of the first and second filter members has an admission face and an exhaust face interconnected by said first and second faces, at least one downstream region of the first face presenting weak or no adhesion with said joint extending to the common edge between the exhaust face and said first face.

10. A structure according to claim 9, wherein said downstream region presents a length taken parallel to a longitudinal direction of the first filter member that is less than one-fifth of the length of said first filter member taken along said longitudinal direction.

11. A structure according to claim 10, wherein said downstream region presents a length, taken parallel to a longitudinal direction of the first filter member, that is less than half of at least one other region of the same face.

12. A structure according to claim 9, wherein the first filter member further comprises a side face adjacent to the first face, the side face presenting a side region of strong adhesion with said joint extending to the common outlet edge between said side face and said exhaust face.

13. A structure according to claim 9, wherein at least the downstream region of weak or no adhesion with the joint presents surface irregularities beside the joint.

14. The filter structure according to claim 1, wherein said filter structure is a particle filter for exhaust gas from an internal combustion engine.

15. The filter structure according to claim 13, wherein said irregularities are corrugations and/or grooves.

* * * * *